United States Patent Office 2,992,115
Patented July 11, 1961

2,992,115
PRODUCTION OF MEAT EMULSIONS AND PRODUCTS
Louis Sair, Evergreen Park, and Stephan L. Komarik, Chicago, Ill., assignors to The Griffith Laboratories, Inc., Chicago, Ill., a corporation of Illinois
No Drawing. Filed Mar. 4, 1960, Ser. No. 12,692
13 Claims. (Cl. 99—159)

The present invention relates to the production of cured meat emulsions containing certain seasoning agents, such as are commonly used in sausage and other encased meat products.

It has long been known that mild acidity is favorable to cured meat products, and especially to the color and permanence thereof. Fresh meat, in general, is mildly acid and has a natural pH in the range 5.8 to 6.3. The term "meat" as used herein comprehends lean and fat, and the meat used for emulsions always consists of lean and fat. The so-called emulsification of meat is the physical incorporation of the fat content as dispersed finely divided particles with protein of the lean functioning as a part of, or as all of, the dispersing agent, with or without the presence of visual particles of lean meat.

It is common to employ material of the capsicum family in the preparation of ground meat products. Members of this family include paprika, chillies and various peppers. They provide both color and flavor. Paprika is high in color and low in flavor, while red pepper is high in both pungency and color. Mixed members are used to control the degree of combined pungency and color. The color derives from carotinoid bodies. These may be concentrated in capsicum meat-additives by extracting the oleoresins, which may be used instead of the ground natural forms or mixed with ground natural forms.

The carotinoid bodies complement the cured color pigment of the meat, giving a depth of color often desired by the trade. Because of the strong pungency found in the peppers, use of paprika is more wide spread.

In using members of the capsicum family it is important to limit the amount beacuse it introduces an orange color and use of it leads to an orange cast. For example, rarely more than 4 ounces of paprika per 100 pounds of meat are used, the normal range being from 2 to 3 ounces. The color of the cured meat pigment is quite labile to light because cured meat begins to oxidize and change its color to gray. The orange color becomes more prominent against the gray than it is against the red, giving an off-color to cured meat exposed to light.

The present invention is based on the discovery that by emulsifying capsicum-containing cured-meat compositions in the presence of glucono delta lactone, the resulting acidity of the finished emulsion acts to increase the life of the initial cured color. This has the effect of preventing the earlier change from red to gray, and therefore, minimizes the extent to which the orange cast from the capsicum additive becomes visible. By preserving the cured red color in the presence of the capsicum color, the desirable depth of cured red color remains when the product is exposed to light, for example, as it is displayed for sale.

Cured meat emulsions are more commonly made from mixtures of meat with seasonings and a curing salt composition containing alkali metal nitrite with or without alkali metal nitrate. The resulting cured products containing capsicum, provided as paprika, chillies or peppers, in natural form or as their oleoresins, or a mixture of these, have an initial bright red color with an orange cast which increases with the content of paprika or pepper. The stability of the red color is important where the cured product is offered for sale. In particular, as exposed to light, the initial red color or the red-orange color, even after it is fixed by heat, as in smoking encased products, changes to orange-gray or gray-brown which is unattractive to purchasers. This is true in spite of the inclusions of an ene-diol compound, as set forth in Hollenbeck No. 2,739,899, which is known to improve the stability of color in cured meats. The preferred ene-diol compounds are isomers of ascorbic acid or water-soluble edible salts thereof, such as the sodium and calcium salts.

It is known that the water-binding capacity and the emulsifying qualities of the meat protein are related to the pH of the meat composition, and both are better, the higher the pH. In the pH range of 5.5 to 5.8, the said properties of the meat protein are appreciably lower than in the pH range of 6.0 to 6.2. The addition of certain alkali-metal salts of phosphoric acid is frequently practiced to neutralize the lactic acid of the meat and raise the pH to increase the water-binding capacity and emulsifying property. In consequence, edible acid has not been commercially employed in processing cured meat compositions to be emulsified, even though its contribution to color and stability of color may be beneficial.

The present invention is based upon the knowledge that a meat composition lacking added free acid and containing glucono delta lactone may be emulsified while a major portion of said lactone remains unhydrolyzed during and at the end of the emulsification. Then, the lactone hydrolyzes to gluconic acid. The result is to provide an emulsion containing edible acid for all the benefits derivable from such acid, and to secure an emulsion formed in the absence of such acid, which emulsion is one of quality better than may be produced in the presence of such acid.

It has been found that when said lactone is added to a meat mass to be emulsified, the spontaneous hydrolytic generation of acid is so retarded that the mass may be emulsified in a time-controlled period to yield substantially the same quality of emulsion as does the same meat mass without adding the lactone. After the emulsion is formed, the generation of edible acid in it does not alter the initial quality of the emulsion, since by that time the fat has been subdivided to fine particles encased by protein. For example, a meat mass containing freshly added glucono delta lactone, and a similar mas containing an equivalent amount of gluconic acid yield, when both are quickly emulsified in about 20 minutes, relatively and respectively, excellent and poor emulsions, yet in about three hours, after completing the emulsion, they both have the same pH, and the same content of gluconic acid.

At about 40° F., which temperature characterizes meat in process, the hydrolysis of glucono delta lactone takes place at substantially the same rate in water and in a 5% by weight solution of sodium chloride, the latter being chosen because sodium chloride is commonly present in meat emulsions. Table I shows the titrations of two solutions, containing the same amount of glucono delta lactone (hereinafter referred to as GDL). To 100 ml. of water and to 100 ml. of a 5% solution of sodium chloride, were added 300 mg. of GDL, and then the two were titrated with 0.1N solution of sodium hydroxide.

TABLE I

| Time | ml. Water | 0.1N NaOH/ NaCl |
|---|---|---|
| 10 minutes | 3.2 | 2.6 |
| 1 hour | 7.8 | 7.5 |
| 3 hours | 10.8 | 11.1 |

Table I shows that approximately 25% of the lactone hydrolyzes in the first ten minutes, and the remainder hydrolyzes more slowly over a three-hour period. Conventional apparatus for forming emulsions are used to emulsify in as short a time as one minute and as long a time as twenty to twenty-five minutes. The GDL or a composition containing GDL is preferably added last to a composition to be emulsified, and then the emulsification is carried out as promptly as possible and preferably in a period short of twenty-five minutes, thus to minimize an adverse content of free acid during the emulsification.

The present invention is based upon the improvement in color-stability of cured emulsified meat products containing capsicum material and an ene-diol compound, when emulsified in the presence of GDL.

In carrying out the invention, the GDL is used only in small quantity in a range equivalent to 0.5 to 8 ounces of GDL per 100 pounds of meat. The quantity used may be added to the meat as a dry ingredient per se, or be included as a dry ingredient in a mixture of other dry ingredients, such as a mixture commonly used as a seasoning composition. Frequently, other additives are employed, and these may be separate ingredients or one or more mixtures commonly added separately from a curing salt mixture. Some of these additives are illustrated below, it being understood that they are not essential to the practice of the present invention in its broadest sense.

Although the preferred practice is to emulsify a comminuted meat mass containing GDL, it is to be understood that the meat mass to receive the GDL may be wholly emulsified, or be a comminuted meat mass not as far advanced as an emulsion. The GDL, for example, may be added to the contents of a silent cutter at any stage, such as in its coarse comminuted stage, or its emulsifying stage. In the case of a slow-acting emulsification process, the GDL may best be added late in the process so that the final emulsification is completed in an appreciable time prior to the completion of the hydrolysis of the lactone, and preferably while a major portion of the GDL remains unhydrolyzed. In the case of a slow batch-processing in a silent cutter, the best results are effected by completing the emulsification and then continuing the action by uniformly mixing into the emulsion the lactone. In the case of continuous processing in comminuting machines, or colloidal mills, the GDL is present in the composition continuously fed to the machine.

Bologna was prepared with various amounts of paprika with and without GDL, and with an ene-diol compound as shown in Example 1.

*Example 1*

The following basic composition was used:

| | | |
|---|---|---|
| Lean beef (pH 6.40) | lbs | 60 |
| Pork jowls (pH 6.00) | lbs | 40 |
| Chipped ice | lbs | 25 |
| Sodium chloride | ozs | 34 |
| Curing salt | ozs | 6 |
| Sodium chloride, 90% | | |
| Sodium nitrite, 6% | | |
| Sodium nitrate, 4% | | |
| Bologna seasoning | ozs | 12 |
| Sodium isoascorbic | oz | 0.625 |
| Paprika | | x |
| GDL | | y |

The following Table II gives the results of emulsifying the seasoned composition with and without GDL.

TABLE II

| Example | x<br>Ounces Paprika | y<br>Ounces GDL | pH<br>Finished Sausage |
|---|---|---|---|
| 1a | 2 | ——— | 6.00 |
| 1b | 4 | ——— | 6.00 |
| 1c | 6 | ——— | 6.00 |
| 1d | 2 | 4 | 5.90 |
| 1e | 4 | 4 | 5.85 |
| 1f | 6 | 4 | 5.85 |

The finished sausage was stored overnight in a cooler at 45° F., and then sliced for color evaluation of the filling as given in Table III.

TABLE III

| Example | Color of Fresh Slice | After 6-hour Exposure to direct daylight |
|---|---|---|
| 1a | Good color | Brownish. |
| 1b | Good with orange cast | Very brown. |
| 1c | Undesirable deep orange cast | Do. |
| 1d | More reddish-pink than 1a | Reddish pink. |
| 1e | Redder than 1b | Most desirable red of all. |
| 1f | Less orange cast than 1c | Red with orange cast. |

After the 6-hour exposure to daylight, the sausages were stored overnight at 45° F., and marked recovery of color was observed in those with GDL, which had better colors than those without GDL. After five additional days of storage at 45° F., no change of color occurred.

The results with red pepper parallel the results with paprika as shown in Example 2 using both members of the capsicum family as with and without GDL.

*Example 2*

The following meat composition was employed:

| | | |
|---|---|---|
| Lean beef | lbs | 65 |
| Pork jowls | lbs | 35 |
| Chipped ice | lbs | 25 |
| Sodium chloride | ozs | 40 |
| Dry corn syrup solids (D.E.=42) | ozs | 32 |
| Bologna seasoning | ozs | 8 |
| Curing salt | ozs | 4 |
| Sodium chloride, 90% | | |
| Sodium nitrite, 6% | | |
| Sodium nitrate, 4% | | |
| Sodium isoascorbate | oz | 1 |
| Test material | ozs | — |

The test compositions were emulsified promptly after the inclusion of GDL, and the emulsion stuffed into casings (22 x 2¾ inches) and smoked as follows:

1 hour at 160° F.
1 hour at 170° F.
3 hours at 180° F.

5 hours, total, to internal temperature of 152° F.

They were then chilled in cold water for 30 minutes to a temperature of 130° F., then after 30 minutes at room temperature, were placed in storage at 45° F. overnight.

The following Table IV gives the composition of the test sausages and the pH after smoking.

TABLE IV

| Sausage No. | Test Material | ozs. | Finished Sausage, pH |
|---|---|---|---|
| 1 | Paprika | 3.5 | 6.00 |
| 2 | Paprika<br>Glucono delta lactone | 3.5<br>4.0 | 5.80 |
| 3 | Oleoresin of paprika<br>Dextrose carrier | 6 cc.<br>8 | 6.00 |
| 4 | Oleoresin of paprika<br>Dextrose base<br>Glucono delta lactone | 6 cc.<br>8<br>4.0 | 5.8 |
| 5 | Red pepper | 2.0 | 6.00 |
| 6 | Red pepper<br>Glucono delta lactone | 2.0<br>——— | 5.82 |

After the overnight storage slices of the sausages were exposed for seven hours to light of 25 and 30 foot-candles, and those having GDL retained more color than the controls. They were then covered against the light and stored overnight, when they still showed more color than the controls. They were then exposed for eight hours to light of 25 to 30 foot-candles, and the color then evaluated as shown in Table V.

TABLE V

| Sausage Slices | Coloring |
|---|---|
| 1 | Brown with slight orange cast. |
| 2 | Red with the most orange cast. |
| 3 | Brown with slight yellow cast. |
| 4 | Red with slight orange cast. |
| 5 | Brown with slight yellow cast. |
| 6 | Red with slight orange cast. |

Then the slices were again covered from the light and stored overnight, and the color values remained as reported in Table V.

Although all the sausages of Example 2 were made with sodium isoascorbate, the control members showed very little recovery of color after the fading by light exposure.

The combined effect of using the GDL and the capsicum was tested both with and without the presence of a ene-diol compound. It was found that improvement in color is effected in both cases, however, more so when the ene-diol compound is present, as shown in Example 3.

*Example 3*

Using the meat composition and procedure set forth in Example 2, both omitting and including sodium isoascorbate, comparative compositions were produced as set forth in Table VI, which gives the pH of the sausage after smoking.

TABLE VI

| Sausage No. | Test Material | ozs. | Finished Sausage, pH |
|---|---|---|---|
| 1 | Paprika | 4 | 6.20 |
| 2 | Paprika | 4 | 6.00 |
|   | Glucono Delta Lactone | 4 |  |
| 3 | Paprika | 4 | 6.20 |
|   | Sodium Isoascorbate | 7/8 |  |
| 4 | Paprika | 4 | 6.00 |
|   | Sodium Isoascorbate | 7/8 |  |
|   | Glucono Delta Lactone | 4 |  |

After the smoking the sausages were chilled in water for 30 minutes to a temperature of 130° F., then placed in storage at 45° F. overnight plus 24 hours. Then slices of the sausages were cut and laid side by side on wax paper base and overwrapped with cellophane. The so-covered slices were then exposed for seven hours to light of 25 to 30 foot-candles, and color again evaluated as given in Table VII. They were then covered from light and stored overnight, and again evaluated as in Table VII.

TABLE VII

| Sausage Slice | After Light | After Light and Storage |
|---|---|---|
| 1 (Control) | Brown | Brown. |
| 2 | Reddish Brown | Reddish Brown. |
| 3 | More red than 2 | Increased red over 2. |
| 4 | Most red | Reddest. |

Reference is made to the co-filed application of Sair Serial No. 12,693.

The slices were then held for four additional days with exposure to about 10-foot-candle light, and the colors remained substantially unchanged.

It is to be understood that the invention is not limited to the illustrative examples, and may be carried out in numerous ways within the scope of the appended claims.

We claim:

1. The method which comprises emulsifying a meat mass containing nitrite curing salt for forming a cured meat emulsion, capsicum seasoning material, and at least one-half ounce of glucono delta lactone per 100 pounds of meat, and then curing the meat in the emulsion in the presence of the acid generated in the emulsion from said lactone.

2. The method of claim 1 in which the meat mass is emulsified prior to any substantial hydrolysis of said lactone.

3. The method of claim 1 in which the meat mass is emulsified prior to completion of the resulting hydrolysis of said lactone to gluconic acid.

4. The method of claim 1 in which the capsicum seasoning material comprises paprika.

5. The method of claim 1 in which the capsicum seasoning material is selected from the group consisting of ground paprika and oleoresin of paprika.

6. The method of claim 1 in which emulsification is carried out at a pH adapted for producing fine fat particles in said meat mass during emulsification thereof, but in the presence of sufficient glucono delta lactone to lower the pH after completion of the emulsion to a level substantially below that first-mentioned pH necessary for producing said fine fat particles in said emulsified mass.

7. The method of emulsifying meat which comprises incorporating glucono delta lactone into a batch of meat mass in process of being emulsified, said lactone being present in amount of at least one-half ounce per 100 pounds of meat, said meat mass containing nitrite curing salt for forming a cured meat emulsion, and capsicum seasoning material, and then curing the meat in the emulsion in the presence of the acid generated in the emulsion from said lactone.

8. The method which comprises completing the emulsification of a meat mass containing nitrite curing salt for forming a cured meat emulsion, capsicum seasoning material, and a small quantity of glucono delta lactone in the range from 0.5 to 8 ounces per 100 pounds of meat, and then curing the meat in the emulsion in the presence of the acid generated in the emulsion from said lactone.

9. The method which comprises emulsifying a meat mass containing nitrite-curing salt for forming a cured meat emulsion, ene-diol compound for the nitrite-cure, capsicum seasoning material, and at least one-half ounce of glucono delta lactone per 100 pounds of meat, and then curing the meat in the emulsion in the presence of the acid generated in the emulsion from said lactone.

10. The method of claim 9 in which emulsification is carried out at a pH adapted for producing fine fat particles in said meat mass during emulsification thereof, but in the presence of sufficient glucono delta lactone to lower the pH after completion of the emulsion to a level substantially below that first-mentioned pH necessary for producing said fine fat particles in said emulsified mass.

11. The product resulting from the method of claim 1.

12. The product resulting from the method of claim 4.

13. The product resulting from the method of claim 9.

References Cited in the file of this patent

UNITED STATES PATENTS

| 2,355,548 | Musher | Aug. 8, 1944 |
| 2,627,473 | Brissey | Feb. 3, 1953 |
| 2,739,899 | Hollenbeck | Mar. 27, 1956 |
| 2,860,995 | Sair | Nov. 18, 1958 |

UNITED STATES PATENT OFFICE
CERTIFICATION OF CORRECTION

Patent No. 2,992,115                              July 11, 1961

Louis Sair et al.

It is hereby certified that error appears in the above numbered patent requiring correction and that the said Letters Patent should read as corrected below.

Column 2, line 44, for "mas" read -- mass --; same column 2, TABLE I, the heading to columns 2 and 3 thereof should appear as shown below instead of as in the patent:

| ml.   | 0.1N  | NaOH |
|-------|-------|------|
| Water |       | NaCl | column 5, line 19, for "a" read -- an --; lines 62 and 63, strike out "Reference is made to the co-filed application of Sair Serial No. 12,693." and insert the same as a new paragraph after "unchanged." in line 67, same column 5.

Signed and sealed this 21st day of November 1961.

(SEAL)
Attest:

ERNEST W. SWIDER
Attesting Officer

DAVID L. LADD
Commissioner of Patents